United States Patent
Gaonkar et al.

(10) Patent No.: US 8,409,643 B2
(45) Date of Patent: Apr. 2, 2013

(54) METHODS FOR THE APPLICATION OF INGREDIENTS TO THE INSIDE OF A STRAW

(75) Inventors: Anilkumar Ganapati Gaonkar, Buffalo Grove, IL (US); Cathy Jean Ludwig, Grayslake, IL (US); Neil Edward Darin, Grayslake, IL (US); Robert Jones, Aurora, IL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 0 days.

(21) Appl. No.: 13/029,811

(22) Filed: Feb. 17, 2011

(65) Prior Publication Data

US 2011/0143005 A1 Jun. 16, 2011

Related U.S. Application Data

(62) Division of application No. 11/218,942, filed on Sep. 2, 2005, now abandoned.

(51) Int. Cl.
A47G 21/18 (2006.01)

(52) U.S. Cl. ............................ 426/85; 426/104; 426/112

(58) Field of Classification Search .................. 206/219, 206/438, 484; 264/209.1, 211.12; 426/85, 426/115, 89, 90, 91, 112, 104, 132, 294, 426/238
See application file for complete search history.

(56) References Cited

U.S. PATENT DOCUMENTS

| | | | |
|---|---|---|---|
| 575,206 A | 1/1897 | Britton |
| 1,254,115 A | 1/1918 | Brand |
| 1,810,453 A | 6/1931 | Webster et al. |
| 1,996,203 A | 4/1935 | Hollingsworth |
| 2,036,706 A | 4/1936 | Law |
| 2,102,920 A | 12/1937 | Savage |
| 2,128,448 A | 8/1938 | Wright |
| 2,689,149 A | 9/1954 | Saltzman |
| 2,867,536 A | 1/1959 | Mead et al. |
| 2,901,357 A | 8/1959 | Epstein |
| 3,099,565 A | 7/1963 | Neuhauser |
| D199,350 S | 10/1964 | Davis |
| 3,171,581 A | 3/1965 | Kugler |
| 3,252,803 A | 5/1966 | Belasco |
| 3,463,361 A | 8/1969 | Cook et al. |
| 3,545,980 A | 12/1970 | Stanger |
| 3,615,595 A | 10/1971 | Guttag |
| 3,620,770 A | 11/1971 | Harvey |
| 3,824,322 A | 7/1974 | Fiorella |
| 3,957,202 A | 5/1976 | Hornsby, Jr. |
| 4,363,205 A | 12/1982 | Hollander, Jr. |
| 4,537,308 A | 8/1985 | Hollander, Jr. |
| 4,717,016 A | 1/1988 | Dalgleish |
| 4,726,518 A | 2/1988 | Martina et al. |
| 4,816,268 A | 3/1989 | Tsau |
| 4,860,929 A | 8/1989 | Lowe et al. |
| 4,921,713 A | 5/1990 | Fowler |
| 4,981,468 A | 1/1991 | Benefiel et al. |
| 4,986,451 A | 1/1991 | Lowe et al. |
| 5,076,425 A | 12/1991 | Plone |
| 5,094,861 A | 3/1992 | D'Auguste et al. |
| 5,427,315 A | 6/1995 | Lipson |
| 5,427,316 A | 6/1995 | Leone |
| 5,568,973 A | 10/1996 | Gorab |
| 5,584,434 A | 12/1996 | Lipson |
| 5,662,268 A | 9/1997 | Katzenberger |
| 5,663,223 A | 9/1997 | Teumac et al. |
| 5,718,681 A | 2/1998 | Manning |
| 5,736,180 A | 4/1998 | Peiffer et al. |
| 5,753,284 A | 5/1998 | Green et al. |
| 5,809,868 A | 9/1998 | Milone |
| 5,863,964 A | 1/1999 | Teumac et al. |
| 5,932,262 A | 8/1999 | Little |
| 5,996,473 A | 12/1999 | Milone |
| RE36,815 E | 8/2000 | Teumac et al. |

(Continued)

FOREIGN PATENT DOCUMENTS

AU 9122898 3/1999
AU 732975 5/2001

(Continued)

OTHER PUBLICATIONS

Young, Lee W.; International Search Report, PCT/US05/34768 dated Sep. 24, 2007; 1 page.

(Continued)

*Primary Examiner* — Rena Dye
*Assistant Examiner* — Chaim Smith
(74) *Attorney, Agent, or Firm* — Fitch, Even, Tabin & Flannery LLP

(57) ABSTRACT

Methods of coating the interior surface of a hollow tubular structure, in particular a drinking device, and more particularly a drinking straw, with an edible composition to impart a desirable modification to a beverage that is drunk through the straw. The edible composition comprises an adhering agent and a powdered ingredient coated to the interior surface. Suitable adhering agents include lipids (e.g., soybean oil, corn oil, canola oil, sunflower oil, rapeseed oil, peanut oil, and mixtures thereof), medium chain triglycerides oils, emulsifiers, and mixtures thereof. Suitable powdered ingredients include edible acids, edible bases, sweeteners, flavorings, vitamins, minerals, colorants, sensate agents, carotenoids, antioxidants, polyphenols, phytonutrients, and mixtures thereof. The adhering agent is applied to the interior surface of the straw by any one of a number of methods followed by incorporating the powdered ingredient into the adhering agent layer. The powdered ingredient adheres or sticks to, and is incorporated into, the adhering agent layer. Once the powdered ingredient layer is added, the coated drinking straw is ready for use with a beverage.

20 Claims, No Drawings

U.S. PATENT DOCUMENTS

| | | | |
|---|---|---|---|
| 6,102,224 | A | 8/2000 | Sun et al. |
| 6,109,538 | A | 8/2000 | Villani et al. |
| 6,238,713 | B1 | 5/2001 | Von Rhein |
| 6,245,373 | B1 | 6/2001 | Baron et al. |
| 6,283,294 | B1 | 9/2001 | Thorball et al. |
| 6,375,019 | B1 | 4/2002 | Hirota et al. |
| 6,419,904 | B1 | 7/2002 | Combe et al. |
| 6,440,450 | B1 | 8/2002 | Han et al. |
| 6,482,451 | B1 | 11/2002 | Baron |
| 6,511,686 | B1 | 1/2003 | Farbood et al. |
| 6,511,726 | B1 | 1/2003 | Kinigakis |
| 6,541,055 | B1 | 4/2003 | Luzenberg |
| 6,561,434 | B2 | 5/2003 | Kaplan |
| 6,565,899 | B1 | 5/2003 | Cecere |
| 6,586,023 | B1 | 7/2003 | Song et al. |
| 6,602,535 | B1 | 8/2003 | Farbood et al. |
| 6,638,549 | B1 | 10/2003 | Lloyd |
| 6,692,781 | B2 | 2/2004 | Ryan et al. |
| 2001/0036468 | A1 | 11/2001 | Han et al. |
| 2002/0092919 | A1 | 7/2002 | Campagna |
| 2002/0127319 | A1 | 9/2002 | Gare |
| 2002/0157970 | A1 | 10/2002 | Carlson |
| 2003/0087005 | A1 | 5/2003 | Baron |
| 2003/0168772 | A1 | 9/2003 | Palaniappan et al. |
| 2003/0203075 | A1 | 10/2003 | Taylor |
| 2003/0232095 | A1 | 12/2003 | Garti et al. |
| 2003/0232111 | A1 | 12/2003 | Sanso |
| 2004/0009129 | A1 | 1/2004 | Yang |
| 2004/0013722 | A1 | 1/2004 | Yang |
| 2004/0013772 | A1 | 1/2004 | Weiss et al. |
| 2004/0046042 | A1 | 3/2004 | Judd |
| 2004/0109932 | A1 | 6/2004 | Chen et al. |
| 2007/0051741 | A1 | 3/2007 | Gaonkar et al. |

FOREIGN PATENT DOCUMENTS

| | | | |
|---|---|---|---|
| EP | 0781107 | | 7/1997 |
| EP | 0833789 | | 4/1998 |
| EP | 0942656 | | 9/1999 |
| EP | 0959694 | | 12/1999 |
| EP | 1340431 | | 9/2003 |
| GB | 512831 | | 9/1939 |
| GB | 2 366 178 | * | 9/2000 |
| JP | 60227654 | | 11/1985 |
| JP | 2005841 | | 1/1990 |
| JP | 3240652 | | 10/1991 |
| JP | 5246431 | | 9/1993 |
| JP | 8332701 | | 12/1996 |
| JP | 10033377 | | 2/1998 |
| JP | 10265369 | | 10/1998 |
| JP | 2000211682 | | 8/2000 |
| WO | 9312770 | | 7/1993 |
| WO | 9318757 | | 9/1993 |
| WO | 9604833 | | 2/1996 |
| WO | 9640485 | | 12/1996 |
| WO | 9700213 | | 1/1997 |
| WO | 9815187 | | 4/1998 |
| WO | 9847783 | | 10/1998 |
| WO | 9909871 | | 3/1999 |
| WO | 9926491 | | 6/1999 |
| WO | 0025744 | | 5/2000 |
| WO | 0130412 | | 5/2001 |
| WO | 0194525 | | 12/2001 |
| WO | 0226275 | | 4/2002 |
| WO | 02100220 | | 12/2002 |
| WO | 03076166 | | 9/2003 |
| WO | 03090565 | | 11/2003 |
| WO | 03101226 | | 12/2003 |
| WO | 03105607 | | 12/2003 |
| WO | 2007030123 | A2 | 3/2007 |

OTHER PUBLICATIONS

Van Bastelaere, T.; Supplementary European Search Report; EP05807460.0 dated Dec. 21, 2010; 2 pages.

Van Bastelaere, T.; European Search Opinion; EP05807460.0 dated Dec. 21, 2010; 4 pages.

Young, Lee W.; Written Opinion of the International Searching Authority; PCT/US05/34768 dated Sep. 24, 2007; 5 pages.

* cited by examiner

METHODS FOR THE APPLICATION OF INGREDIENTS TO THE INSIDE OF A STRAW

FIELD OF THE INVENTION

This disclosure relates generally to processes for the application and adherence of powdered food ingredients to the inside of a straw. The processes provide an efficient way to coat the straw with only necessary components (i.e., the powdered food ingredient and an adhering agent) without a drying or hardening step.

BACKGROUND

Various types of coated, flavored drinking straws are known. A coated, flavored drinking straw is typically used to impart a flavor to a beverage that is drunk through the coated straw. Coatings on a straw typically contain a flavor ingredient that can be applied in numerous fashions.

U.S. Patent Publication US 2003/0168772 (Sept. 11, 2003) provides a method of coating a straw by applying a flavor coating combined with hydrocolloid or starch solution as the straw is being extruded.

Most other methods occur post-manufacture (i.e., after the straw has been made). U.S. Pat. No. 1,996,203 (Apr. 2, 1935) provides a coated straw when the flavor substance is placed within the straw by pouring a flavored syrup or juice into the interior of a straw and letting it dry. U.S. Patent Publication U.S. 2004/0109932 (Jun. 10, 2004) provides a coated straw by melting the flavor ingredients and incorporating it into a solution consisting of a plasticizer, monoglyceride, and water. The solution is applied to the interior of the straw and dried to drive off water.

International Patent Publication WO 99/09871 (Mar. 4, 1999) uses an adhesive, which entraps flavor particles, which may be coated with an encapsulating agent; this composition is then coated on the exterior of the straw. As the adhesive melts or dissolves in an aqueous solution, the flavor particles are released. U.S. Pat. No. 4,816,268 (Mar. 28, 1989) uses a solution containing a flavor additive to coat the inside of a straw. The polarity or temperature of the solvent is then modified to crystallize the solution within the straw.

U.S. Pat. No. 6,283,294 (Sep. 4, 2001) provides a tube or straw that is coated with an oil and a bacteria suspension or an additive (e.g., vitamins, minerals, pharmaceutical compositions). The straw is coated with an oil (e.g., corn oil or wax) by (1) insertion of an elongated stick coated with the oil, (2) a tubular filling device, or (3) spraying the inside of the tube. The bacteria suspension or additive may be incorporated into the oil either before or after the oil is applied to the interior of the straw.

U.S. Pat. No. 6,109,538 (Aug. 29, 2000) provides a flavored straw, which contains screens on the inside of the straw and flavoring particles on and between the screens. The screens allow the liquid to pass through without physically releasing the flavor particles; as the liquid passes through the screen, however, the particles are dissolved and impart a flavor to the liquid. U.S. Patent Publication US 2003/0203075 (Oct. 30, 2003) provides an insert made of a paper or filter material within the interior of the straw; the insert is coated with, or contains, a flavor delivery system or solution, which is released as liquid passes through it. These processes may add considerable time and expense to creating a flavored straw.

Currently, however, there is no method or process for coating the inside of a manufactured straw which consists of only coating an adhering agent plus a food ingredient without any additional components and without having to first solubilize the two and without additional process steps, such as heating, hardening, or drying. Current methods involve either first solubilizing the ingredients to be coated, addition of additional ingredients to the food component and adhesive, a crystallization step, or a drying step.

SUMMARY

Methods are disclosed for coating the inside of a hollow tubular structure, or a straw, with an edible composition to impart a desired effect to a beverage when the beverage is consumed using the straw. Such effects include optical or color modification or changes, flavor modifications, or delivery of nutrients or other desirable components to the beverage upon passage through the tubular structure. The edible composition comprises a lipid and a powdered ingredient. The edible composition is coated onto the interior surface by introducing a predetermined amount of the adhering agent into the straw; the powdered ingredient is then introduced to the inside of the straw, whereby the powdered ingredient is incorporated into to the adhering agent layer. The straw can then be packaged for use with beverages. No drying or hardening steps are involved. For purposes of this invention, "beverages" include any edible liquid food or drink which can be consumed using the straw; thus, beverages include typical beverage or drinks as well as yogurt drinks, soups, liquid nutritional supplements, and other liquid foods.

DETAILED DESCRIPTION

Methods for applying food ingredients to the inside of a drinking straw to impart a flavor or other effect (e.g., optical or color change; sensory changes such as cooling, tingling, warming or the like; delivery of nutrients or other desirable components) to a beverage used with the drinking straw are disclosed herein. A drinking device having a tubular or cylinder-like shape that forms a shaft with a distal end and a proximal end, wherein the distal and proximal ends are open and communicate with each other to form a hollow tubular structure within the shaft, is used. The hollow tubular structure thus forms an interior surface within the drinking device through which beverages typically pass there through. An interior region of the straw is thus defined by the walls of the interior surface of the straw. An example of a drinking device is a drinking straw used to convey a beverage from one end of the straw to another through the interior region or from the distal end of the straw to the proximal end.

The straw may be made from paper, cardboard, plastic, metal, glass, wax, or similar materials. An edible composition is coated onto the interior surface of the straw which imparts a flavor or other effect to a beverage that is being passed through the straw. The edible composition comprises, and preferably consists essentially of, an adhering agent and a powdered ingredient (e.g., flavoring agent). Adhering agents include lipids (e.g., vegetable oils such as soybean oil, corn oil, canola oil, sun flower oil, rapeseed oil, peanut oil, and the like); medium chain (i.e., 6-12 carbon atoms) triglycerides oils; emulsifiers such as mono- or diglycerides, lecithins, and the like; and mixtures thereof. Preferably, the adhering agent is a vegetable oil which is liquid at reasonable temperatures (i.e., about 20° C. or less) at which the straw can be exposed; more preferably, the adhering agent is liquid at ambient temperatures. Typically, the adhering agent, preferably a lipid, is applied to the interior surface of the drinking device to form an essentially continuous coating or layer on the interior surface. The powdered ingredient is then applied so that it adheres or sticks to the adhering agent and hence to the interior surface of the straw. No baffles, screens, or other internal structures nor any drying or hardening steps are used to form or maintain the edible composition within the straw.

The predetermined amount of adhering agent, preferably a lipid, may be introduced into the interior of the straw by a number of different methods. The predetermined amount is an amount sufficient to form a thin layer on at least a portion of the interior surface of the straw such that the desired amount of powdered ingredient can be deposited. In some cases, this portion will be at least one-half of the interior surfaces and more preferably at least three fourths of the interior surface; in other cases (e.g., where only a small amount of the powdered ingredient is needed (e.g., intense coloring or flavoring agent or mineral supplement)), less than one-half of the interior needs to be coated with the adhering agent. For purposes of this invention, a thin layer is a layer which is about 0.1 to about 10 percent of the inner diameter of the straw if of circular cross section or of the smallest inner cross sectional dimension if non-circular. Ideally, for a straw about 3.5 mm in diameter and about 13.5 cm long (i.e., a typical sized tubular drinking straw) about 60 mg of the lipid is introduced into the interior. For other sized straws, a proportional amount is generally preferred and can be easily determined based on the dimensions of the differently sized straw.

One method to coat the interior surface of the straw is to dip or immerse either the distal end or the proximal end of the straw (and preferably some length of the straw) into a container holding the lipid. The lipid will enter through the open end of the straw and become entrapped inside. As the straw is removed from the container some of the lipid remains coated on the interior surface of the straw where the lipid was in contact with it. To sufficiently disperse the lipid throughout the interior surface of the straw where it is desired to cover the maximum interior surface, the straw may be inverted to allow gravity to act upon the lipid in the straw and cause the lipid layer to travel or flow further down the interior surface. Any lipid adhering to the outside of the straw may be simply wiped off or otherwise removed; alternatively the drinking straw (or preferably straws) may be fitted into a form or other holder such that the lipid only contacts the interior surface or surfaces when the form (and thus the straws) are dipped into the lipid.

Another method to coat the interior surface of the straw is to spray the lipid into the interior of the straw. For example, a nozzle or other spraying device can be inserted into the opening at either the distal end or the proximal end of the straw. Then a predetermined amount of lipid is applied into the interior of the straw as a liquid or mist. The nozzle is then removed and gravity is allowed to act upon the lipid and cause the lipid layer to flow down the shaft of the straw and to sufficiently coat the interior surface of the straw; if desired, the straw may be inverted to allow the lipid to cover more of the interior surface. Still another possible method is to apply a vacuum at either the distal end or the proximal end and a lipid supply at the opposite end. The vacuum draws the lipid up inside of the interior of the straw and coats the interior surface of the straw as it passes through the interior region. Once an adequate amount is drawn up into the straw, the vacuum is removed. The amount of lipid that is added to the interior of the straw is controlled by the force and duration of the vacuum. Gravity is then allowed to pull the lipid meniscus down the shaft of the straw; if desired, the straw may be inverted to allow the lipid to cover more of the interior surface.

Of course, other methods of initially applying the lipid to the interior of the straw or distributing the lipid within the interior of the straw (e.g., blowing, brushing, tumbling, and the like) can be used so long as an adequate amount of the lipid can be applied and the interior surface is sufficiently coated with the lipid.

Processing parameters of such methods described above can be controlled to apply the desired amounts of lipid composition to the entire interior surfaces or any portion of the interior surfaces desired. Of course, other methods may be used to apply the lipid into the interior of the straw.

Once the lipid layer is sufficiently coated onto the interior surface of the straw, the powdered ingredient may be applied. Although not wishing to be limited by theory, it appears that the powdered ingredient both adheres and interacts with the lipid layer to form some type of non-flowing matrix or composite. Thus, there is no need to dry or hardened the lipid layer. The powdered ingredient is in a solid powder form with a typical average particle size of about 1 micron to 2 mm. Examples of the powdered ingredient include edible acids (e.g., citric acid, malic acid, and tartaric acid), edible bases (e.g., baking soda), sweeteners (natural or artificial) flavorings, vitamins, minerals, colorants, sensate agents (e.g., cooling agents such as menthol, peppermint, and the like; warming agents such as capsicum and the like; and tingling agents such as alkamide spilanthol and the like), carotenoids (e.g., beta-carotene, lutein, and lycopene), antioxidants, polyphenols, phytonutrients, and the like as well as mixtures thereof. The powdered ingredient will adhere or stick to the lipid layer when introduced inside of the straw. The powdered ingredient is incorporated into the lipid coating. Incorporated "into" means that the powdered ingredient may be introduced either into the lipid such that it is combined with the lipid layer, or that the powdered ingredient is introduced as a single coating or layer that adheres to the lipid layer.

The powdered ingredient may be introduced into the straw by using a vacuum source. A similar technique is used as when applying the lipid layer by vacuum, except that a powdered ingredient is being used. The amount of powdered ingredient applied to the interior of the straw and into the lipid layer is controlled by the force and duration of the vacuum source applied and the amount of lipid present within the straw. The amount of the powdered ingredient (per single drinking straw) may vary from about 1 to about 500 mg, more preferably from about 10 mg to about 300 mg, depending on the powdered ingredient that is being used and the effect desired. Other techniques may be used to apply or introduce the powdered ingredient so long as it is incorporated into the lipid layer.

The straw is then completed and is ready for use or may be packaged for later use with a beverage. The coated interior surface straw is used to add an effect (e.g., flavor, color, nutritional, sensory, or other effect) to the beverage when the consumer uses the straw to drink a beverage by sucking it through the interior of the straw with his/her mouth. As the liquid passes through the interior of the straw it contacts the powdered compound on the interior surface. During contact, the beverage either dissolves or dislodges the powdered ingredient into the beverage stream thus imparting the desired effect or effects to the beverage.

EXAMPLES

Example 1

A flavor compound is added to the inside or interior surface of a straw. A straw was about 3.5 mm in diameter and about 13.5 cm long. A vegetable-based oil (Neobee M-5 oil; Stepan Company, Maywood, N.J.) was used as the adhering component. The vegetable-based oil (60 mg) was introduced into one end of the straw by drawing vacuum from the other end of the straw. Excess oil adhering to the exterior surface of the straw was removed. The straw was then inverted so that the oil flowed down to coat essentially the entire interior surface. The lipid layer was about 100 micron thick. The same end of the straw that was introduced into the oil was then used to introduce the powdered flavor ingredient (i.e., fine granular citric acid monohydrate; Archer Daniels Midland Company, Decatur, Ill.) using a vacuum source. The vacuum was applied for about 1 second; approximately 150-200 mg of citric acid powder was introduced into the oil layer and onto the interior surface of the straw. The straws were then check weighed to determine if the correct amount of ingredient had been added. The coated straws are then used to impart an initial intense sour flavor to a sweet ready-to-drink beverage (e.g., KoolAid) when the consumer drinks through the coated straw.

Example 2

A straw was coated in the same manner as Example 1, except that malic acid was used in place of citric acid.

Example 3

A straw was coated in the same manner as Example 1, except that a mixture of 50% citric acid and 50% malic acid was used.

Example 4

A straw was coated with a powdered grape flavor (about 20 mg) using the same manner as Example 1. Upon drinking a flavored beverage using the straw, a grape flavor is perceived in the first few sips before the original flavor of the beverage is perceived.

Example 5

A straw was coated with a powdered lemon flavor (about 10 mg) using the same manner as Example 1. Upon drinking a flavored beverage using the straw, a lemon flavor is perceived in the first few sips before the original flavor of the beverage is perceived.

Example 6

A straw was coated in the same manner as Example 1, except that a powdered combination of 43.75% citric acid, 43.75% malic acid and 12.5% grape flavor was used. The three ingredients were blended together and then applied to the interior surface of the straw. Upon drinking a flavored beverage using the straw, a sour grape flavor is perceived in the first few sips before the original flavor of the beverage is perceived.

Example 7

A straw was coated in the same manner as Example 6, except that a lemon flavor was used in place of the grape flavor. Upon drinking a flavored beverage using the straw, a sour lemon flavor is perceived in the first few sips before the original flavor of the beverage is perceived.

Example 8

A straw was coated in the same manner as Example 1, except that 5 mg of powdered elemental iron was used and incorporated into the lipid layer. Upon drinking a beverage using the straw, the consumer notices no taste effect, but is provided a good source of iron. Various iron salts as well as other minerals could be provided in a similar manner. Flavors could also be incorporated into the lipid layer to mask any undesirable flavor due the mineral component or just to make the beverage more satisfying.

Example 9

A straw was coated in the same manner as Example 1, except that 5 mg of powdered colorant (i.e., Blue #1) was used and incorporated into the lipid layer. Upon inserting the straw in a clear ready-to-drink beverage, the beverage turned blue. Other colorants can also be used. Moreover, a desired color effect can be achieved using various colorants in the initial beverage and in the straw.

Example 10

A straw was coated in the same manner as Example 6, except that powdered menthol (about 20 mg) was used as the powdered ingredient. Upon drinking a beverage using the straw, a cooling effect is perceived.

Example 11

A straw was coated in the same manner as Example 6, except that spray dried peppermint oil (about 20 mg) was used as the powdered ingredient. Upon drinking a beverage using the straw, a cooling effect is perceived.

What is claimed is:

1. A method for preparing a drinking device containing an edible composition comprising an adhering agent and a powdered ingredient, wherein the drinking device is suitable for consuming a beverage and wherein the powdered ingredient imparts a desirable modification to the beverage when consumed using the drinking device, said method comprising:
    providing a hollow tubular structure having a distal end and a proximal end, wherein the hollow tubular structure is open at both the distal end and proximal end such that an interior surface is defined therein;
    coating the interior surface with an adhering agent to form an adhering agent layer; and
    applying a powdered ingredient in the form of a flowable solid powder to the adhering agent layer on the interior surface to form the edible composition, the flowable solid powder adhering to the adhering agent layer to form an edible composition layer with the hollow tubular structure the solid powder imparting the desirable modification to the beverage when the beverage is consumed using the drinking device, and
    the edible composition layer is formed in the tubular structure without drying or hardening steps.

2. The method as defined in claim 1, wherein the desired effect is selected from the group consisting of color modification, flavor modification, sensory modification, nutritional modification, and combinations thereof.

3. The method as defined in claim 2, wherein the adhering agent is selected from the group consisting of lipids, soybean oil, corn oil, canola oil, sunflower oil, rapeseed oil, peanut oil, medium chain triglycerides oils, mono/diglycerides, lecithins, and mixtures thereof.

4. The method as defined in claim 1, wherein the adhering agent is coated on the interior surface by first dipping the distal end or the proximal end into the adhering agent so that adhering agent is contained in the hollow tubular structure and then inverting the drinking device so that the adhering agent flows down the hollow tubular structure thereby coating the interior surface.

5. The method as defined in claim 1, wherein the adhering agent is coated on the interior of the hollow tubular structure using a spraying device which is attached to the interior of the hollow tubular structure at the distal end or proximal end and then allowing the adhering agent to flow down the hollow tubular structure thereby coating the interior surface.

6. The method as defined in claim 1, wherein the adhering agent is coated on the interior surface of the hollow tubular structure using a vacuum source to draw the adhering agent up into the interior of the hollow tubular structure at the distal end or proximal end and then allowing the adhering agent to flow down the hollow tubular structure thereby coating the interior surface.

7. The method as defined in claim 2, wherein the adhering agent is selected from the group consisting of lipids, medium chain triglycerides oils, emulsifiers, and mixtures thereof.

8. The method as defined in claim 2, wherein the adhering agent is selected from the group consisting of soybean oil, corn oil, canola oil, sunflower oil, rapeseed oil, peanut oil, and mixtures thereof.

9. The method as defined in claim 7, wherein the powdered ingredient is incorporated into the coating of the adhering agent using a vacuum source to draw the powdered ingredient up into the interior of the hollow tubular structure at the distal end or the proximal end such that it adheres to the coating of the adhering agent.

10. The method as defined in claim 2, wherein the powdered ingredient is selected from the group consisting of edible acids, edible bases, sweeteners, flavorings, vitamins, minerals, colorants, sensate agents, carotenoids, antioxidants, polyphenols, phytonutrients, and mixtures thereof.

11. The method as defined in claim 3, wherein the powdered ingredient is selected from the group consisting of edible acids, edible bases, sweeteners, flavorings, vitamins, minerals, colorants, sensate agents, carotenoids, antioxidants, polyphenols, phytonutrients, and mixtures thereof.

12. The method as defined in claim 10, wherein the edible acids are citric acid, malic acid, or tartaric acid; wherein the edible base is baking soda; wherein the sensate agents are cooling agents, warming agents, or tingling agents; and wherein the carotenoids are beta-carotene, lutein, or lycopene.

13. The method as defined in claim 11, wherein the edible acids are citric acid, malic acid, or tartaric acid; wherein the edible base is baking soda; wherein the sensate agents are cooling agents, warming agents, or tingling agents; and wherein the carotenoids are beta-carotene, lutein, or lycopene.

14. The method as defined in claim 1, wherein the hollow tubular structure is constructed from paper, cardboard, plastic, metal, glass, or wax.

15. The method as defined in claim 2, wherein the hollow tubular structure is constructed from paper, cardboard, plastic, metal, glass, or wax.

16. A method for preparing a drinking device containing an edible composition comprising an adhering agent and a flowable solid powder, wherein the drinking device is suitable for consuming a beverage and wherein the powdered ingredient imparts a desirable modification to the beverage when consumed using the drinking device, said method comprising:
   providing a hollow tubular structure having a distal end and a proximal end, wherein the hollow tubular structure is open at both the distal end and proximal end such that an interior surface is defined therein;
   coating the interior surface at about ambient temperature with an adhering agent comprising a lipid to form an adhering agent layer; and
   drawing with a vacuum the flowable solid powder into the hollow tubular structure to effect contact of the flowable solid powder with the adhering agent layer on the interior surface to form the edible composition, the flowable solid powder adhering to the adhering agent layer to form an edible composition layer with the hollow tubular structure, the solid powder imparting the desirable modification to the beverage when the beverage is consumed using the drinking device, and
   the edible composition layer is formed in the tubular structure without drying or hardening steps.

17. The method as defined in claim 16, wherein the adhering agent is selected from the group consisting of soybean oil, corn oil, canola oil, sunflower oil, rapeseed oil, peanut oil, medium chain triglycerides oils, mono/diglycerides, lecithins, and mixtures thereof.

18. The method as defined in claim 17, wherein the flowable solid powder is selected from the group consisting of edible acids, edible bases, sweeteners, flavorings, vitamins, minerals, colorants, sensate agents, carotenoids, antioxidants, polyphenols, phytonutrients, and mixtures thereof.

19. The method as defined in claim 18, wherein the edible acids are citric acid, malic acid, or tartaric acid; wherein the edible base is baking soda; wherein the sensate agents are cooling agents, warming agents, or tingling agents; and wherein the carotenoids are beta-carotene, lutein, or lycopene.

20. The method as defined in claim 19, wherein the hollow tubular structure is constructed from paper, cardboard, plastic, metal, glass, or wax.

* * * * *